United States Patent
Yang et al.

(10) Patent No.: US 11,288,776 B2
(45) Date of Patent: Mar. 29, 2022

(54) METHOD AND APPARATUS FOR IMAGE PROCESSING

(71) Applicant: Lenovo (Beijing) Co., Ltd., Beijing (CN)

(72) Inventors: Shuangxin Yang, Beijing (CN); Tingting Zhao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 137 days.

(21) Appl. No.: 16/457,003

(22) Filed: Jun. 28, 2019

(65) Prior Publication Data
US 2020/0005436 A1 Jan. 2, 2020

(30) Foreign Application Priority Data
Jun. 29, 2018 (CN) .......................... 201810706207.9

(51) Int. Cl.
*G06T 5/00* (2006.01)
*G06T 7/50* (2017.01)
*G06T 5/20* (2006.01)
*G06T 1/60* (2006.01)

(52) U.S. Cl.
CPC ............... *G06T 5/003* (2013.01); *G06T 5/20* (2013.01); *G06T 7/50* (2017.01); *G06T 1/60* (2013.01)

(58) Field of Classification Search
None
See application file for complete search history.

(56) References Cited

U.S. PATENT DOCUMENTS

| 6,961,072 | B2 | 11/2005 | Stansbury et al. |
| 2012/0084652 | A1* | 4/2012 | Martinez Bauza .. H04N 13/167 715/719 |
| 2014/0176776 | A1* | 6/2014 | Morita ................. H04N 5/2621 348/333.11 |
| 2016/0035074 | A1* | 2/2016 | Jeong ....................... G06T 3/40 382/282 |
| 2016/0277656 | A1* | 9/2016 | Tsunoda ........... H04N 5/232939 |

FOREIGN PATENT DOCUMENTS

| CN | 1890960 A | 1/2007 |
| CN | 100490487 C | 5/2009 |
| CN | 102298495 A | 12/2011 |
| CN | 103164134 A | 6/2013 |
| CN | 106559563 A | 4/2017 |
| CN | 106844659 A | 6/2017 |

* cited by examiner

*Primary Examiner* — Leon Viet Q Nguyen
(74) *Attorney, Agent, or Firm* — Anova Law Group, PLLC (57) ABSTRACT

The present disclosure provides an image processing method. The method includes generating a first image exhibiting a first display effect from a master image and generating a second image exhibiting a second display effect from the master image. The second display effect is different from the first display effect.

20 Claims, 6 Drawing Sheets

METHOD AND APPARATUS FOR IMAGE PROCESSING

CROSS-REFERENCES TO RELATED APPLICATION

This application claims priority to Chinese Patent Application No. 201810706207.9, entitled "Image Processing Method and Apparatus," filed on Jun. 29, 2018, the entire content of which is incorporated herein by reference.

FIELD OF TECHNOLOGY

The present disclosure relates to the field of image processing technology, and more specifically, to a method and apparatus for image processing.

BACKGROUND

Often, an image can be stored under different folders based on the objects included in the image. For example, face recognition technology may recognize that an image includes a plurality of characters, correspond each character to a folder, and store the image including the character under the corresponding folder, thereby achieving the purpose of categorizing the same image into different folders based on the target object.

However, when the same image is being categorized into different folders, the image may exhibit the same display effect when the image is being viewed in different folders.

BRIEF SUMMARY OF THE DISCLOSURE

A first aspect of the present disclosure provides an image processing method. The method includes generating a first image exhibiting a first display effect from a master image and generating a second image exhibiting a second display effect from the master image. The second display effect is different from the first display effect.

A second aspect of the present disclosure provides an image processing apparatus, including a processor and a display unit. The processor is configured to generate a first image exhibiting a first display effect from a master image; and generate a second image exhibiting a second display effect from the master image. The second display effect is different from the first display effect.

A third aspect of the present disclosure provides an image processing apparatus. The image processing apparatus includes a processor and a display unit. The processor is configured to generate a first image with a first display effect from a master image and to store the first image in a first folder; generate a second image with a second display effect from the master image and to store the second image in a second folder; display the first image with the first display effect via the display unit, in response to the first image being accessed from the first folder; and display the second image with the second display effect via the display unit, in response to the second image being accessed from the second folder.

BRIEF DESCRIPTION OF THE DRAWINGS

To describe the technical solutions in the embodiments of the present disclosure more clearly, the following briefly introduces accompanying drawings required for describing the embodiments. Apparently, the accompanying drawings in the following description show merely some embodiments of the present disclosure, and persons of ordinary skill in the art may still derive other drawings according to these accompanying drawings without creative efforts.

DETAILED DESCRIPTION

To make the objectives, technical solutions, and advantages of the embodiments of the present disclosure more comprehensible, the following clearly and describes the technical solutions in the embodiments of the present disclosure with reference to the accompanying drawings in the embodiments of the present disclosure. Apparently, the embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
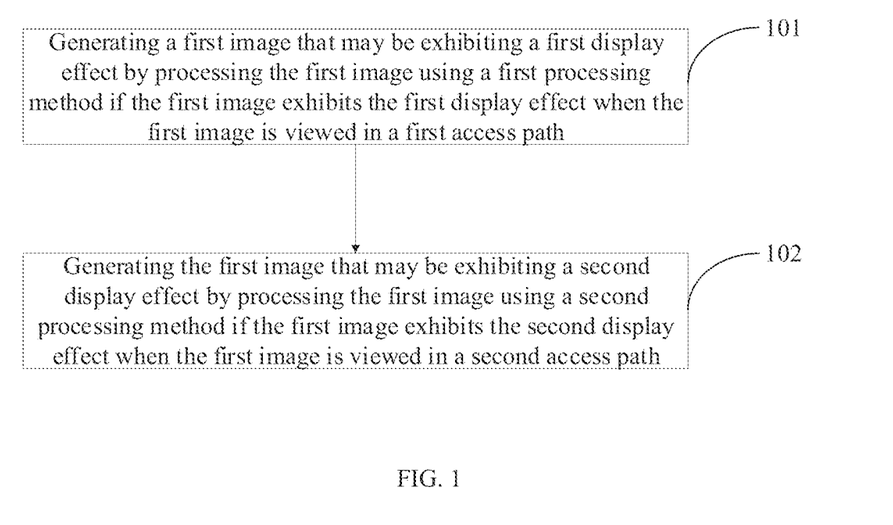
FIG. 1 is a flowchart of an image processing method according to an embodiment of the present disclosure.

Referring to FIG. 1, which is a flowchart of an image processing method according to an embodiment of the present disclosure. The image processing method may be used such that an image may be presented with different display effects when the image is browsed through different access paths. The image processing method is described in more detail below.

101: generating a first image that may be exhibiting a first display effect by processing the first image using a first processing method if the first image exhibits the first display effect when the first image is viewed in a first access path.

It may be understood that the first image may be any one of the generated images, such as an image captured by a camera, or an image downloaded from a platform, etc., such that the first image acquired by different methods may adopt the image processing method of the present embodiment. The first access path may be an access path that may be mapped to the first image for viewing the first image, and the type of access path is not limited in the present embodiment. For example, the first access path may be any one of a network path, a folder in which the first image may be located, a directory corresponding to the first image, and the like.

If the first access path is a first folder of a first object in the first image, a method for the first image to be presented in the first display effect when the first image is browsed through the first access path may be: presenting the first image in the first display effect by processing the first image using the first processing method if the first image is browsed through the first folder. A method for processing the first image using the first processing method may be: using the first processing method to change the display of the first image, but not generating the image including the first display effect. Another method for processing the first image using the first processing method may be: generating the image including the first display effect and mapped the image including the first display effect to the first access path. As such, the image including the first display effect may be outputted directly when the first image is browsed through the first access path again, which may save the processing time, but may take up the storage space.

In the present embodiment, the first processing method may be a processing method for processing an original first image to change an original displayed effect (the display effect before the first image is processed) of the original image. For example, the first processing method may be any one of repairing the first image, adding a special effect, changing the sharpness level of the first image, and the like. The repairing of the first image may include, but is limited to one or more of processing the first image by using digital image processing techniques, changing the size of the first image, and rotating the first image. Processing the first image by using digital image processing techniques includes, but is not limited to one or more of enhancing, sharpening, defogging, noise reduction, color or saturation adjustment, etc. of the first image. As such, when the first image is processed by using the first processing method, the first display effect corresponding to the first processing method may be presented. For example, when an enhancement processing is performed on the first image, the first display effect may be to highlight details in the first image.

Further, the first processing method may be processing the entire area of the first image or processing a portion of the first image, such as processing an object in the first image. In addition, when the first image is browsed through the first access path, the first display effect of the first image may be the same or different when viewed in different times. For example the first display effect of the first image viewed on the $i^{th}$ time may be different than the first display effect of the first image viewed on the $i+n^{th}$ time, where n may be a natural number greater than or equal to 1, thereby allowing the first image to exhibit a diverse display effect.

To achieve different first display effects of the first image when viewed in different times, the embodiment may make the first image correspond to a plurality of first processing methods. For example, different first processing methods may be used when the first image is viewed on the $i^{th}$ time and the $i+n^{th}$ time, or a usage order of the plurality of first processing methods corresponding to the first image may be determined, and the first processing method may be used sequentially based on the number of access when browsing the first image through the first access path. However, it should be noted that the total number of the plurality of first processing methods corresponding to the first image may be less the number of accesses of browsing through the first access path. In this case, if the last processing method of the plurality of processing methods corresponding to the first image is used, the process may return to the initial first processing method, and the first processing method may be sequentially used from the initial first processing method.

When viewing the first image in the first access path, the first image may be processed by using one or more first processing methods, such that the first image may present one or more display effects. For example, when viewing the first image in the first access path, the first image may be subjected to two processes of defogging and rotating, such that the first image may exhibit two display effects. That is, the first display effect in the present embodiment may include one or more display effects. In the case of including two or more display effects, a part of the display effect of the two or more display effects may be different. Further, each time the first image is viewed in the first access path, at least a part of the display effect may be the same among the plurality of display effects included in the first display effect of the first image.

102: generating the first image that may be exhibiting a second display effect by processing the first image using a second processing method if the first image exhibits the second display effect when the first image is viewed in a second access path.

The second access path may be an access path that may be different from the first access path, which may be mapped to the first image for viewing the first image, and the type of access path is not limited in the present embodiment. For example, the first access path may be any one of a network path, a folder in which the first image may be located, a directory corresponding to the first image, and the like.

If the second access path is a second folder of a second object (an object different from the first object) in the first image, a method for the first image to be presented in the second display effect when the first image is viewed in the second access path may be: presenting the first image in the second display effect by processing the first image using the second processing method if the first image is browsed through the first folder. A method for processing the first image using the second processing method may be: using the second processing method to change the display of the first image, but not generating the image including the second display effect. Another method for processing the first image using the second processing method may be: generating the image including the second display effect and mapped the image including the second display effect to the second access path. As such, the image including the second display effect may be outputted directly when the first image is viewed in the second access path again, which may save the processing time, but may take up the storage space.

In one embodiment, the second processing method may be the same as the first processing method, and may also be a processing method for processing an original first image to change an original displayed effect (the display effect before the first image is processed) of the original image. For example, the second processing method may be any one of repairing the first image, adding a special effect, changing the sharpness level of the first image, and the like, such that the first image may be presented with the second display effect. For a detailed description of the second processing method, reference may be made to the description of the first processing method, and the second processing method will not be described in detail again.

In one embodiment, the second processing method may be different from the first processing. The first processing method may cause the first image to exhibit the first display effect, the second display method may cause the first image to exhibit the second display effect, and the second display effect may be different from the first display effect. A method for achieving this may be: selecting different processing methods as the first processing method and the second processing method. For example, the first processing method may be a processing method of the digital image processing techniques, and the second processing method may be a processing method for changing the size of the first image. Another method for achieving this may be: using the first processing method and the second processing method for different objects in the first image. For example, the first processing method may be used for the entire area of the first image, and the second processing method may be used for a partial area of the first image. Alternative, the first processing method may be used for the first object in the first image, and the second processing method may be used for other objects other in the first image other than the first object, such as the second object.

When the second display effect and the first display effect respectively include two or more display effects, the difference between the second display effect and the first display effect may be: at least a portion of the display effect included in the second display effect may be different from the display effects in the first display effect; or, one of the second display effect and the first display effect may include one display effect, and the other may include two or more display effects. When one of the second display effect and the first display effect may include one display effect, and the other may include two or more display effects, the two or more display effects may be different from the one display effect. For example, the second display effect may include two display effects, the first display effect may include one display effect, and the two display effects included in the second display effect may be different from the one display effect included in the first display effect.

In one embodiment, the first image may be viewed by using other access paths other than the first access path and the second access path. Further, the first image may exhibit a display effect different from the first display effect and the second display effect when the first image is viewed through other access paths, which is not described in detail in the present embodiment.

Based on the embodiments of the present disclosure, if the first image exhibits the first display effect when the first image is viewed through the first access path, the first display effect exhibited by the first image may be generated by processing the first image using the first processing method; if the first image exhibits the second display effect when the first image is viewed through the second access path, the second display effect exhibited by the first image may be generated by processing the first image using the second processing method; and the second display effect may be different from the first display effect. As such, when the first image is viewed through the first access and the second access path respectively, different display effects may be exhibited, and the purpose of viewing the same image with different display effects through different access paths may be achieved.

Figure 2:
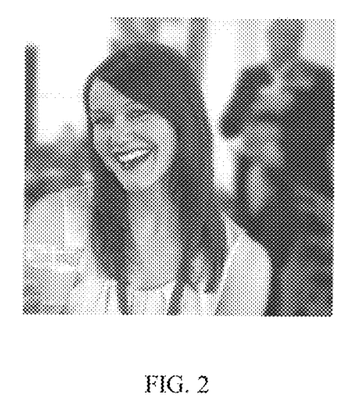
FIG. 2 is a schematic diagram illustrating a first display effect of a first image according to an embodiment of the present disclosure.
Figure 3:
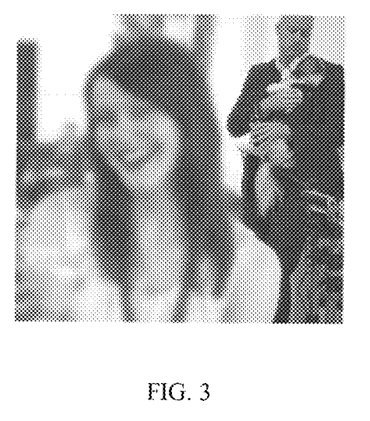
FIG. 3 is a schematic diagram illustrating a second display effect of a first image according to an embodiment of the present disclosure.

The image processing method of the present disclosure is described below in the following embodiment. In one embodiment, the first access path may be a first folder corresponding to a first object in the first image, and the second access path may be a second folder corresponding to a second object in the first image. For example, the first image may be an image including two person, the first object may be a woman in the first image, and the second object may be a man in the first image. Correspondingly, first folder may be a folder corresponding to the woman, and the second folder may be a folder corresponding to the man. By processing the first image using the first processing method, the first display effect of the first image may be that the sharpness level of the woman is higher than the sharpness level of the man, as shown in FIG. 2. By processing the first image using the second processing method, the second display effect of the first image may be that the sharpness level of the man is higher than the sharpness level of the woman, as shown in FIG. 3. As such, when the first image is viewed in the folder corresponding to the woman, the display effect shown in FIG. 2 may be exhibited; and when the first image is viewed in the folder corresponding to the man, the display effect shown in FIG. 3 may be exhibited, thereby achieving the purpose of viewing the same image with different display effects through different access paths.

Figure 4:
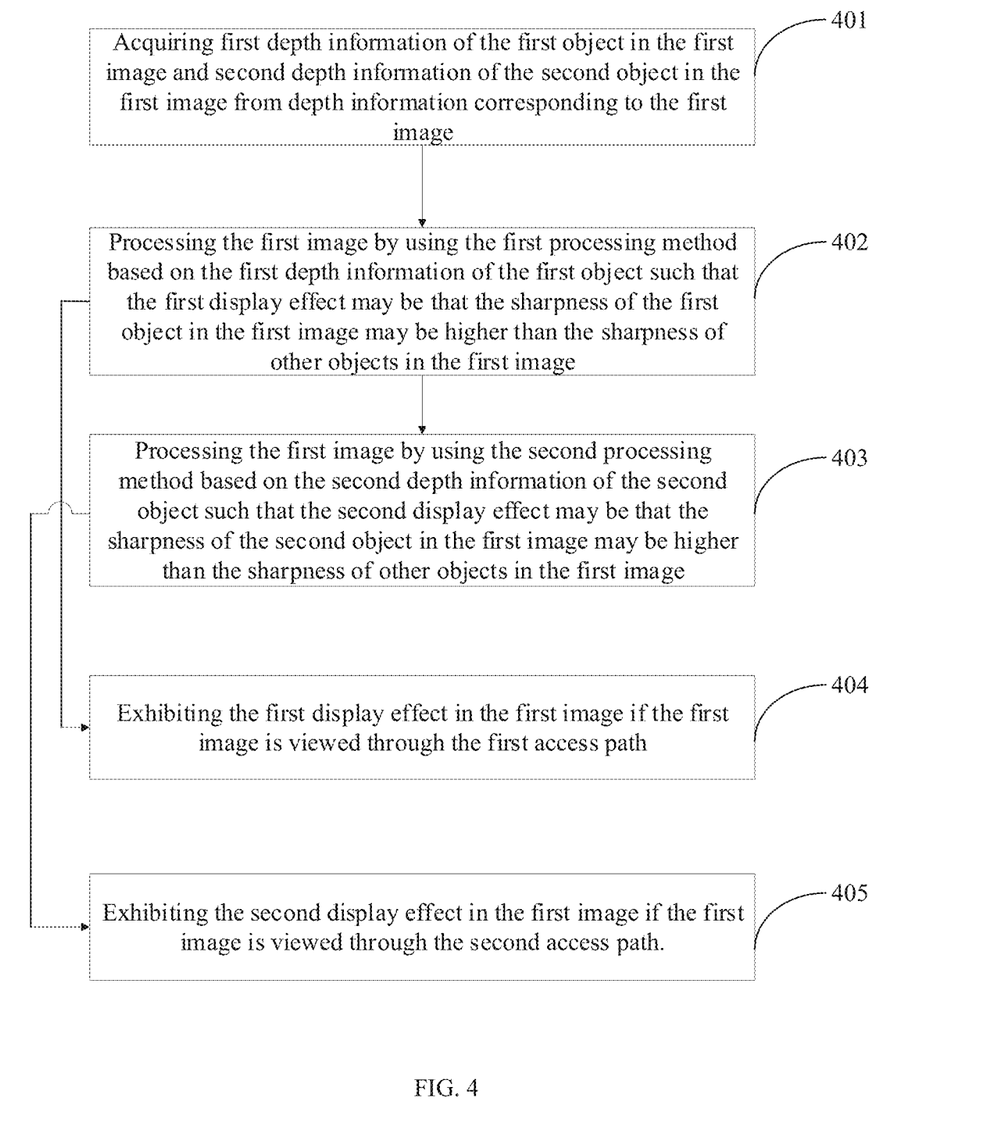
FIG. 4 is another flowchart of an image processing method according to an embodiment of the present disclosure.

To achieve the display effects shown in FIG. 2 and FIG. 3, FIG. 4 provides a flowchart of an image processing method according to an embodiment of the present disclosure. The image processing method may include the following steps.

401: acquiring first depth information of the first object in the first image and second depth information of the second object in the first image from depth information corresponding to the first image. The first object in the first image and the second object in the second image may be determined by using any determination method, such as randomly selecting two objects, or determining an animal, a plant, a building, and the like in the first image by using an image recognition technique. For the first image corresponding to FIG. 2 and FIG. 3, the first object may be determined to be the woman, and the second object may be determined to be the man.

Further, the first depth information of the first object in the first image may be different from the second depth information of the second object in the first image. As such, the first image may be processed by using the respective depth information. A method for acquiring the first depth information of the first object and the second depth information of the second object may be: extracting the first depth information corresponding to the first object and the second depth information corresponding to the second object from the depth information corresponding to the first image based on the first object and the second object. That is, in the depth information corresponding to the first image, the depth information of each object may be stored based on the corresponding relationship between the object and the depth information. As such, when an object is determined from the first image, the depth information corresponding to the object may be identified based on the object, and the depth information may be the depth information of the object.

402: processing the first image by using the first processing method based on the first depth information of the first object, as such, the first display effect may be that the sharpness level of the first object in the first image may be higher than the sharpness level of other objects in the first image. A method for achieving this process may be: refocusing the first image based on the first depth information of the first image such that the first display effect that the sharpness level of the first object in the first image may be higher than the sharpness level of the other objects in the first image.

403: processing the first image by using the second processing method based on the second depth information of the second object, as such, the second display effect may be that the sharpness level of the second object in the first image may be higher than the sharpness level of other objects in the first image. A method for achieving this process may be: refocusing the first image based on the second depth information of the second image such that the second display effect that the sharpness level of the second object in the first image may be higher than the sharpness level of the other objects in the first image.

In one embodiment, step 402 and step 403 may be performed in parallel. If step 402 and step 403 are performed sequentially, the first image may be viewed in the first folder after the processing is performed by using the first processing method without waiting for the completion of the processing of the first image by using the second processing method.

404: exhibiting the first display effect in the first image if the first image is viewed through the first access path.

405: exhibiting the second display effect in the first image if the first image is viewed through the second access path.

In addition, in one embodiment, the first depth information of the first object may be stored under the first access path, and the second depth information of the second object may be stored under the second access path. As such, the first depth information of the first object may be acquired through the first access path and the second depth information of the second object may be acquired through the second access path, thereby facilitating other processing of each object by using the respective depth information.

Figure 5:
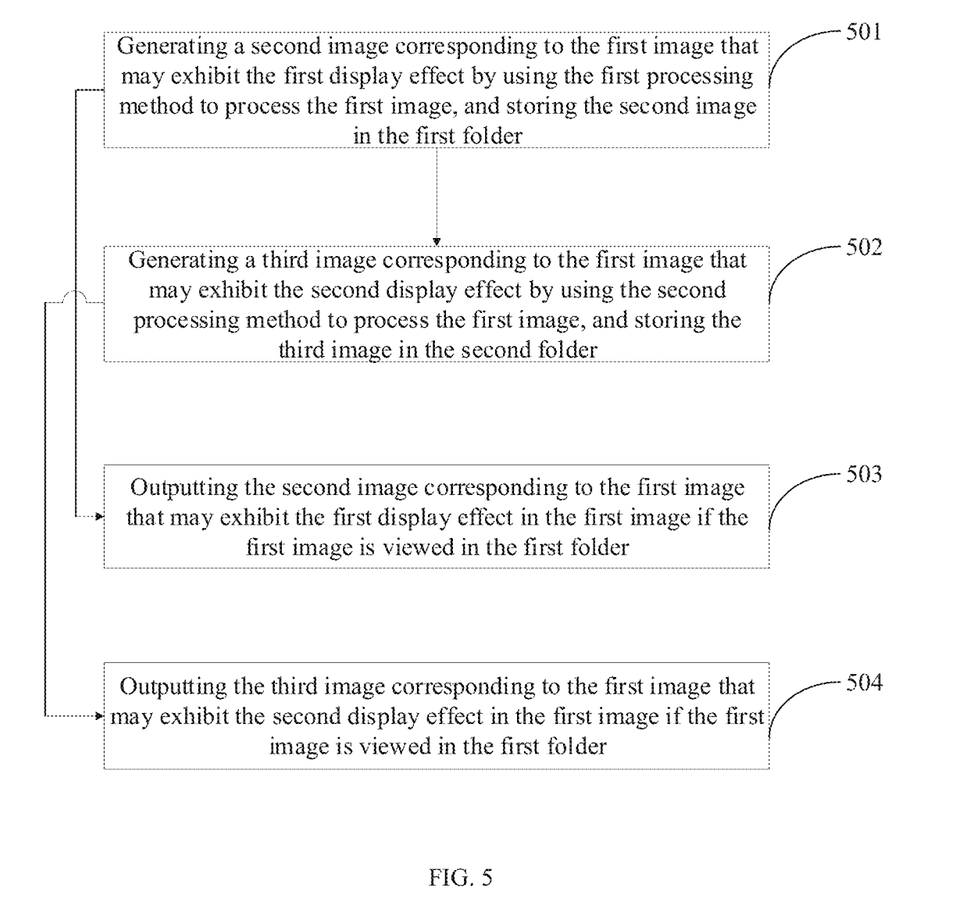
FIG. 5 is still another flowchart of an image processing method according to an embodiment of the present disclosure.

Referring to FIG. 5, which is still another flowchart of an image processing method according to an embodiment of the present disclosure. In this embodiment, the first access path may be the first folder corresponding to the first object in the first image, and the second access path may be the second folder corresponding to the second object in the first image. The determination of the first object and the second object is not limited in this embodiment. The image processing method shown in FIG. 5 may include the following steps.

501: generating a second image corresponding to the first image that may exhibit the first display effect by using the first processing method to process the first image, and storing the second image in the first folder.

That is, before the first image is viewing through the first folder, the first image may be processed by using the first processing method to generate the second image corresponding to the first image that may exhibit the first display effect, and the second image may be mapped to the first folder as the first access path by means of storing. As such, when the first image is viewed in the first folder, the second image corresponding to the first image exhibiting the first display effect may be outputted directly, thereby saving time for processing the first image during viewing, and improving the display efficiency. However, since the second image may be generated and may take up a storage space, the storage space may be reduced when compared to the method in which the image may not be generated.

502: generating a third image corresponding to the first image that may exhibit the second display effect by using the second processing method to process the first image, and storing the third image in the second folder.

That is, before the first image is viewing through the first folder, the first image may be processed by using the first processing method to generate the second image corresponding to the first image that may exhibit the first display effect, and the second image may be mapped to the first folder as the first access path by means of storing. As such, when the second image is viewed in the first folder, the third image corresponding to the first image exhibiting the second display effect may be outputted directly, thereby saving time for processing the first image during viewing, and improving the display efficiency. However, since the third image may be generated and may take up a storage space, the storage space may be reduced when compared to the method in which the image may not be generated.

In one embodiment, step 501 and step 502 may be performed in parallel. If step 501 and step 502 are performed sequentially, the first image may be viewed in the first folder while the second image is being generated without waiting for the generation of the third image.

503: outputting the second image corresponding to the first image that may exhibit the first display effect in the first image if the first image is viewed in the first folder.

504: outputting the third image corresponding to the first image that may exhibit the second display effect in the first image if the first image is viewed in the first folder.

It can be seen from the above embodiments, by using the method of generating images with different display effects corresponding to the same image in advance, the purpose of viewing the same image with different display effects when the image is viewed in different folders may be achieved. The method may reduce the processing time during viewing and reduce the display time. However, the storage space may be reduced since the images with different display effects may need to be generated.

In addition, the image processing method of the present disclosure may further include the following steps: sharing the first image processed by using the first processing method, and/or sharing the first image processed by using the second processing method. In one embodiment, the sharing may be an active sharing. For example, a device for performing the image processing method of the present disclosure, such as a terminal or a server, may actively share the first image processed by using the first processing method and/or the first image processed by using the second processing method with another device. The other device may be a device having a relationship with device for performing the image processing method of the present disclosure, such as devices that may have pre-established a connection or devices having special relationship, such as two devices used by users that may be related. In one embodiment, the sharing may be a passive sharing. For example, the device for performing the image processing method of the present disclosure may share the first image corresponding to a sharing request after receiving the sharing request. Alternatively, the sharing in the present embodiment may indicate that the device for performing the image processing method of the present disclosure may publish the first image processed by using the first processing method, and/or the first image processed by using the second processing method to a platform that may be acquired by other devices. The specific sharing method is not limited in the present embodiment.

It should be noted that, to simplify the description, the embodiments mentioned above are described as a combination of a series of actions, but a person skilled in the art should know that the present disclosure is not limited by the described sequence, because according to the present disclosure, some steps may be performed in other sequences or simultaneously. In addition, the person skilled in the art should also know that, the embodiments described in the specification are all exemplary embodiments, and the related actions and modules are not necessarily required by the present disclosure.

Figure 6:
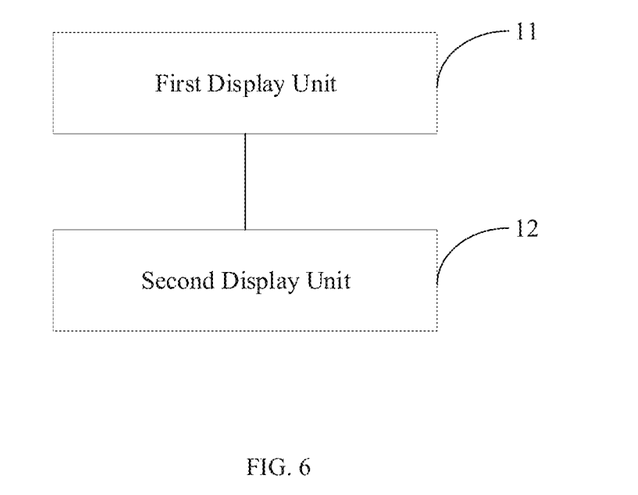
FIG. 6 is a schematic structural diagram of an image processing apparatus according to an embodiment of the present disclosure.

Corresponding to the above method embodiment, an embodiment of the present disclosure further provides an image processing apparatus. The structure of the image processing apparatus is shown in FIG. 6, which may include a first display unit 11 and a second display unit 12.

The first display unit 11 may be used to generate the first image that may exhibit the first display effect by processing the first image using the first processing method if the first image exhibits the first display effect when the first image is viewed in the first access path. The first access path may be the first folder corresponding to the first object in the first image. Correspondingly, the first display unit 11 may be used to make the first image to exhibit the first display effect by using the first processing method to process the first image if the first image is viewed in the first folder.

A method for processing the first image using the first processing method may be: using the first processing method to change the display of the first image, but not generating the image including the first display effect. Another method for processing the first image using the first processing method may be: generating the image including the first display effect and mapped the image including the first display effect to the first access path. As such, the image including the first display effect may be outputted directly when the first image is browsed through the first access path again, which may save the processing time, but may take up the storage space.

In the present embodiment, the first processing method may be a processing method for processing an original first image to change an original displayed effect (the display effect before the first image is processed) of the original image. For example, the first processing method may be any one of repairing the first image, adding a special effect, changing the sharpness level of the first image, and the like. Detail description of the first processing method is provided in the related description of the method embodiment, which is not described herein again.

The second display unit 12 may be used to generate the first image that may exhibit the second display effect by processing the first image using the second processing method if the first image exhibits the second display effect when the first image is viewed in the second access path, where the second display effect may be different from the first display effect.

The second access path may be the second folder corresponding to the second object in the first image. Correspondingly, the second display unit 12 may be used to make the first image to exhibit the second display effect by using the second processing method to process the first image if the first image is viewed in the second folder. For a detailed description of the second processing method, reference may be made to the description of the first processing method, and the second processing method will not be described in detail again.

In one embodiment, the second processing method may be different from the first processing. The first processing method may cause the first image to exhibit the first display effect, the second display method may cause the first image to exhibit the second display effect, and the second display effect may be different from the first display effect. A method for achieving this may be: selecting different processing methods as the first processing method and the second processing method. For example, the first processing method may be a processing method of the digital image processing techniques, and the second processing method may be a processing method for changing the size of the first image. Another method for achieving this may be: using the first processing method and the second processing method for different objects in the first image. For example, the first processing method may be used for the entire area of the first image, and the second processing method may be used for a partial area of the first image. Alternative, the first processing method may be used for the first object in the first image, and the second processing method may be used for other objects other in the first image other than the first object, such as the second object.

When the second display effect and the first display effect respectively include two or more display effects, the difference between the second display effect and the first display effect may be: at least a portion of the display effect included in the second display effect may be different from the display effects in the first display effect; or, one of the second display effect and the first display effect may include one display effect, and the other may include two or more display effects. When one of the second display effect and the first display effect may include one display effect, and the other may include two or more display effects, the two or more display effects may be different from the one display effect. For example, the second display effect may include two display effects, the first display effect may include one display effect, and the two display effects included in the second display effect may be different from the one display effect included in the first display effect.

In one embodiment, the first image may be viewed by using other access paths other than the first access path and the second access path. Further, the first image may exhibit a display effect different from the first display effect and the second display effect when the first image is viewed through other access paths, which is not described in detail in the present embodiment.

Based on the embodiments of the present disclosure, if the first image exhibits the first display effect when the first image is viewed through the first access path, the first display effect exhibited by the first image may be generated by processing the first image using the first processing method; if the first image exhibits the second display effect when the first image is viewed through the second access path, the second display effect exhibited by the first image may be generated by processing the first image using the second processing method; and the second display effect may be different from the first display effect. As such, when the first image is viewed through the first access and the second access path respectively, different display effects may be exhibited, and the purpose of viewing the same image with different display effects through different access paths may be achieved.

Figure 7:
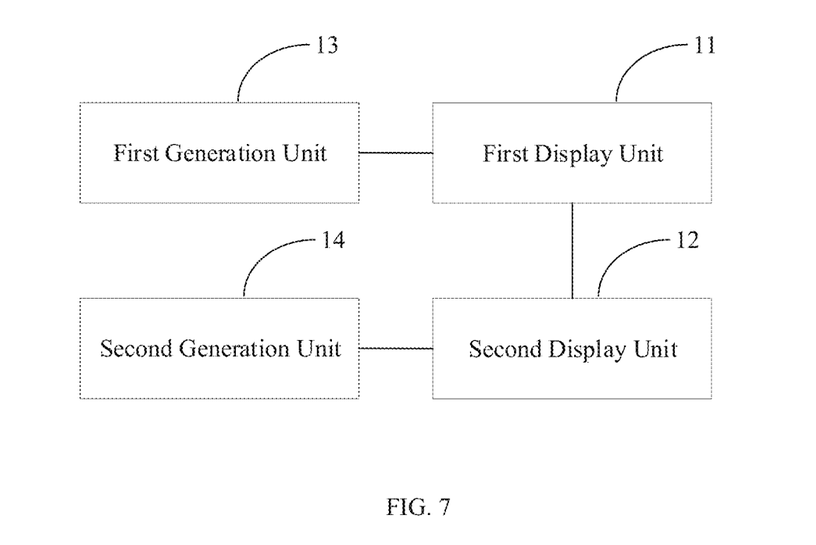
FIG. 7 is another schematic structural diagram of an image processing apparatus according to an embodiment of the present disclosure.

Referring to FIG. 7, which is another schematic structural diagram of an image processing apparatus according to an embodiment of the present disclosure. Based on the basis of FIG. 6, the image processing apparatus may further include a first generation unit 13 and a second generation unit 14.

The first generation unit 13 may be used to generate the second image corresponding to the first image that may exhibit the first display effect by using the first processing method to process the first image, and storing the second image in the first folder.

That is, before the first image is viewed in the first folder, the first image may be processed by using the first processing method to generate the second image corresponding to the first image that may exhibit the first display effect, and the second image may be mapped to the first folder as the first access path by means of storing. As such, when the first image is viewed in the first folder, the second image corresponding to the first image exhibiting the first display effect may be outputted directly, thereby saving time for processing the first image during viewing, and improving the display efficiency. However, since the second image may be generated and may take up a storage space, the storage space may be reduced when compared to the method in which the image may not be generated.

The second generation unit 14 may be used to generate the third image corresponding to the first image that may exhibit the second display effect by using the second processing method to process the first image, and storing the third image in the second folder.

That is, before the first image is viewed in the first folder, the first image may be processed by using the first processing method to generate the second image corresponding to the first image that may exhibit the first display effect, and the second image may be mapped to the first folder as the first access path by means of storing. As such, when the second image is viewed in the first folder, the third image corresponding to the first image exhibiting the second display effect may be outputted directly, thereby saving time for processing the first image during viewing, and improving the display efficiency. However, since the third image may be generated and may take up a storage space, the storage space may be reduced when compared to the method in which the image may not be generated.

Correspondingly, the first display unit 11 may be used to output the second image corresponding to the first image that may exhibit the first display effect when the first image is viewed in the first folder; and the second display unit 12 may be used to output the third image corresponding to the first image that may exhibit the second display effect when the first image is viewed in the second folder.

It can be seen from the above embodiments, by using the method of generating images with different display effects corresponding to the same image in advance, the purpose of viewing the same image with different display effects when the image is viewed in different folders may be achieved. The method may reduce the processing time during viewing and reduce the display time. However, the storage space may be reduced since the images with different display effects may need to be generated.

Figure 8:
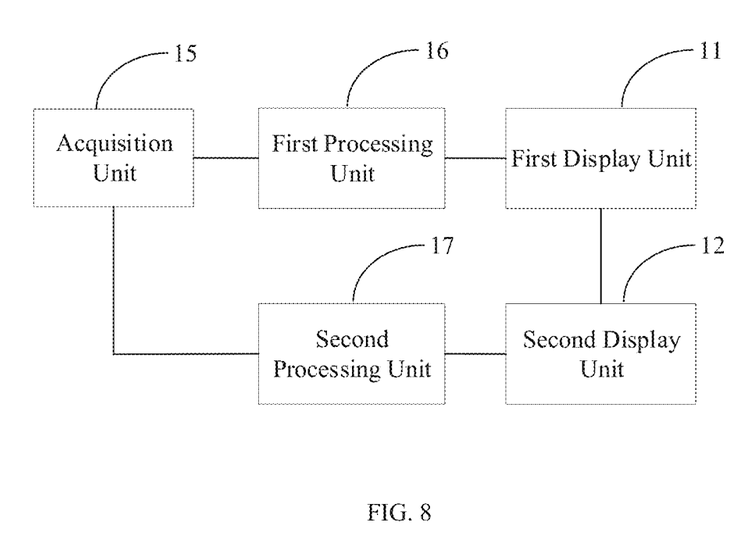
FIG. 8 is still another schematic structural diagram of an image processing apparatus according to an embodiment of the present disclosure.

Referring to FIG. 8, which is still another schematic structural diagram of an image processing apparatus according to an embodiment of the present disclosure. Based on the basis of FIG. 6, the image processing apparatus may further include an acquisition unit 15, a first processing unit 16, and a second processing unit 17.

The acquisition module 15 may be used to acquire the first depth information of the first object in the first image and the second depth information of the second object in the first image from the depth information corresponding to the first image. The first object in the first image and the second object in the second image may be determined by using any determination method, such as randomly selecting two objects, or determining an animal, a plant, a building, and the like in the first image by using an image recognition technique.

Further, the first depth information of the first object in the first image may be different from the second depth information of the second object in the first image. As such, the first image may be processed by using the respective depth information. For the method for acquiring the first depth information of the first object and the second depth information of the second object, reference may be made to the related description in the method embodiment, which is not described herein again.

The first processing unit 16 may be used to process the first image by using the first processing method based on the first depth information of the first object, as such, the first display effect may be that the sharpness level of the first object in the first image may be higher than the sharpness level of other objects in the first image. A method for achieving this process may be: refocusing the first image based on the first depth information of the first image such that the first display effect that the sharpness level of the first object in the first image may be higher than the sharpness level of the other objects in the first image.

The second processing unit 17 may be used to process the first image by using the second processing method based on the second depth information of the second object, as such, the second display effect may be that the sharpness level of the second object in the first image may be higher than the sharpness level of other objects in the first image. A method for achieving this process may be: refocusing the first image based on the second depth information of the second image such that the second display effect that the sharpness level of the second object in the first image may be higher than the sharpness level of the other objects in the first image.

In one embodiment, the image processing apparatus may store the first depth information of the first object under the first access path, and the second depth information of the second object under the second access path. As such, the first depth information of the first object may be acquired through the first access path and the second depth information of the second object may be acquired through the second access path, thereby facilitating other processing of each object by using the respective depth information.

In one embodiment, the image processing apparatus may share the first image processed by using the first processing method, and/or the first image processed by using the second processing method. For details of the sharing method, reference may be made to the related description in the method embodiment, which is not explained in this embodiment.

An embodiment of the present disclosure further provides an image processing device. The image processing device may include a processor and a memory.

The processor may be used to generate the first image that may exhibit the first display effect by processing the first image using the first processing method if the first image exhibits the first display effect when the first image is viewed in the first access path; and generate the first image that may exhibit the second display effect by processing the first image using the second processing method if the first image exhibits the second display effect when the first image is viewed in the second access path, where the second display effect may be different from the first display effect. The memory may be used to store the first image. For detail description of the processor, reference may be made to the related description in the method embodiment, which is not explained in this embodiment.

In addition, an embodiment of the present disclosure further provides a storage medium. The storage medium may store computer executable instructions, and the computer executable instructions may be executed to perform the image processing method mentioned above.

In the embodiments of the present disclosure, when a folder corresponding to a different character (or object) is used as an access path to view the same image, the portion of the same image that may be blurred may be different. As such, the sharpness level of the first object may be higher than the sharpness level of other objects in each of the images categorized to the folder (for example, based on the face recognition technology) of the first object. Regardless of the location of the first object on each of the images in the folder of the first object, the sharpness level of the first object may be higher than the sharpness level of the other objects.

The functional modules or units, such as the acquisition module, in the present disclosure may include one or more computer programs stored in computer readable storage medium. When executed by one or more processors, the computer programs implement the corresponding function of the modules. A functional module or unit, in some embodiments, may be a hardware module, or a module that is implemented by a combination of software and hardware components.

It should be noted that each of the embodiments contained in the present application is described in a progressive manner, and the descriptions thereof may be mutually referenced for portions of each embodiment that are identical or similar; the explanation of each embodiment focuses on areas of different from the other embodiments. Particularly in regard to the system embodiment, because it is fundamentally similar to the method embodiment, the description is relatively simple; portions of the explanation of the method embodiment can be referred to for the relevant aspects.

It should be noted that, as used herein, the relationship terms, such as first, second, etc., are only used to distinguish one entity or operation from another, rather than indicating or suggesting any actual relationship or order among these entities or operations. The term "include", "comprise" or any other variety is intended to cover non-exclusive inclusion, thereby the process, method, article or device including/comprising a series of elements includes/comprises not only those elements, but also other elements that are not explicitly listed, or also includes/comprises elements inherent to the process, method, article or equipment. In case where there is no more restriction, the element defined by a statement "includes/comprises one" does not preclude other similar elements existed in the process, method, article or equipment.

The description of the embodiments herein enables those skilled in the art to implement or use the present disclosure. Numerous modifications to the embodiments will be apparent to those skilled in the art, and the general principle herein can be implemented in other embodiments without deviation from the spirit or scope of the present disclosure. Therefore, the present disclosure will not be limited to the embodiments described herein, but in accordance with the widest scope consistent with the principle and novel features disclosed herein.

The forgoing description is merely particular implementation of the disclosure. It should be noted that, some modifications and alterations may be further made by those skilled in the art without departing from the principle of the present disclosure, and these modifications and alterations also fall within the protection scope of the present disclosure.

What is claimed is:

1. An image processing method, comprising:
   generating a first image exhibiting a first display effect from a master image, a first access path being mapped to the first image for viewing the first image, and the first display effect including multiple display effects; and
   when the first image is viewed through the first access path on an (i+1)th time, displaying the first image having one of the multiple display effects, the one of the multiple display effects being different from another one of the multiple display effects exhibited on the first image when the first image is viewed through the first access path on an (i)th time, i being a positive integer,
   wherein displaying the first image having one of the multiple display effects comprises:
   sequentially using multiple first processing methods, including an initial processing method, to generate the first image having the multiple display effects each time that the first image is viewed; and
   when a last processing method of the multiple first processing methods is used on a previous time that the first image is viewed, performing the initial processing method of the multiple first processing methods to generate the first image.

2. The method of claim 1, further comprising:
   generating a second image exhibiting a second display effect from the master image, wherein the second display effect is different from the first display effect, and a second access path is mapped to the second image for viewing the second image.

3. The method of claim 2, wherein the first access path is a first folder corresponding to a first object in the master image, and the second access path is a second folder corresponding to a second object in the master image.

4. The method of claim 3, further including:
   displaying the first image in response to the master image being viewed in the first folder; and
   displaying the second image in response to the master image being viewed in the second folder.

5. The method of claim 3, further including:
   generating a third image corresponding to the first image and storing the third image in the first folder;
   generating a fourth image corresponding to the second image and storing the fourth mage in the second folder;
   outputting the third image in response to the first image being viewed in the first folder; and
   outputting the fourth image in response to the first image being viewed in the second folder.

6. The method of claim 2, further including:
   acquiring first depth information of a first object in the master image and second depth information of a second object in the master image from depth information corresponding to the master image;
   processing the first image based on the first depth information of the first object, the first display effect being that a sharpness level of the first object in the master image is higher than a sharpness level of other objects in the master image; and
   processing the first image based on the second depth information of the second object, the second display effect being that the sharpness level of the second object in the master image is higher than the sharpness level of other objects in the master image, wherein the first depth information of the first object in the first image is different from the second depth information of the second object in the first image.

7. The method of claim 6, further including:
   storing the first depth information of the first object at a location identified by the first access path; and
   storing the second depth information of the second object at a location identified by the second access path.

8. The method of claim 2, further including:
   sharing the first image and the second image.

9. The method of claim 2, wherein the multiple display effects of the first display effect exhibited on the first image are obtained by using multiple first processing methods on a first object in the master image; and
   the second display effect exhibited on the second image is obtained by using one or more second processing methods on a second object in the master image.

10. An image processing apparatus, comprising:
    a processor; and
    a display unit,
    wherein the processor is configured to:
    generate a first image exhibiting a first display effect from a master image, a first access path being mapped to the first image for viewing the first image, and the first display effect including multiple display effects;

when the first image is viewed through the first access path on an (i+1)th time, display the first image having one of the multiple display effects, the one of the multiple display effects being different from another one of the multiple display effects exhibited on the first image when the first image is viewed through the first access path on an (i)th time, i being a positive integer, wherein when displaying the first image having one of the multiple display effects, the processor is further configured to:

sequentially use multiple first processing methods, including an initial processing method, to generate the first image having the multiple display effects each time that the first image is viewed; and when a last processing method of the multiple first processing methods is used on a previous time that the first image is viewed, performing the initial processing method of the multiple first processing methods to generate the first image.

11. The apparatus of claim 10, wherein the processor is further configured to:

generate a second image exhibiting a second display effect from the master image, wherein the second display effect is different from the first display effect, and a second access path is mapped to the second image for viewing the second image.

12. The apparatus of claim 11, wherein a first access path is a first folder corresponding to a first object in the master image, and a second access path is a second folder corresponding to a second object in the master image.

13. The apparatus of claim 12, wherein the processor is further configured to:

display the first image in response to the master image being viewed in the first folder; and display the second image in response to the master image being viewed in the second folder.

14. The apparatus of claim 12, wherein the processer is further configured to:

generate a third image corresponding to the first image and storing the third image in the first folder;

generate a fourth image corresponding to the second image and storing the fourth image in the second folder;

output the third image in response to the master image being viewed in the first folder; and output the fourth image in response to the master image being viewed in the second folder.

15. The apparatus of claim 11, wherein the processer is further configured to:

acquire first depth information of a first object in the master image and second depth information of a second object in the master image from depth information corresponding to the master image;

process the first image based on the first depth information of the first object, the first display effect being that a sharpness level of the first object in the master image is higher than a sharpness level of other objects in the master image; and process the first image based on the second depth information of the second object, the second display effect being that a sharpness level of the second object in the master image is higher than a sharpness level of other objects in the first image, wherein the first depth information of the first object in the master image is different from the second depth information of the second object in the master image.

16. The apparatus of claim 15, wherein the first depth information of the first object is stored at a location identified by the first access path and the second depth information of the second object is stored at a location identified by the second access path.

17. The apparatus of claim 10, wherein the first image processed by using the first processing method and the first image processed by using a second processing method are shared with another device.

18. A non-transitory storage medium storing computer executable instructions, the computer executable instructions, when being executed by a processor, causing the processor to perform:

generating a first image with a first display effect from a master image, a first access path being mapped to the first image for viewing the first image, and the first display effect including multiple display effects; and when the first image is viewed through the first access path on an (i+1)th time, displaying the first image having one of the multiple display effects, the one of the multiple display effects being different from another one of the multiple display effects exhibited on the first image when the first image is viewed through the first access path on an (i)th time, i being a positive integer;

wherein displaying the first image having one of the multiple display effects comprises:

sequentially using multiple first processing methods, including an initial processing method, to generate the first image having the multiple display effects each time that the first image is viewed; and when a last processing method of the multiple first processing methods is used on a previous time that the first image is viewed, performing the initial processing method of the multiple first processing methods to generate the first image.

19. The storage medium of claim 18, wherein the computer executable instructions further cause the processor to perform:

generating a second image exhibiting a second display effect from the master image, wherein the second display effect is different from the first display effect, and a second access path is mapped to the second image for viewing the second image.

20. The storage medium of claim 19, wherein the first folder is a first access path corresponding to a first object in the master image, and the second folder is a second access path corresponding to a second object in the master image.

* * * * *